A. C. LINDGREN.
PLOW.
APPLICATION FILED NOV. 8, 1917.

1,334,543.

Patented Mar. 23, 1920.
2 SHEETS—SHEET 1.

Inventor.
Alexus C. Lindgren,
by Chas. E. Lord
Atty.

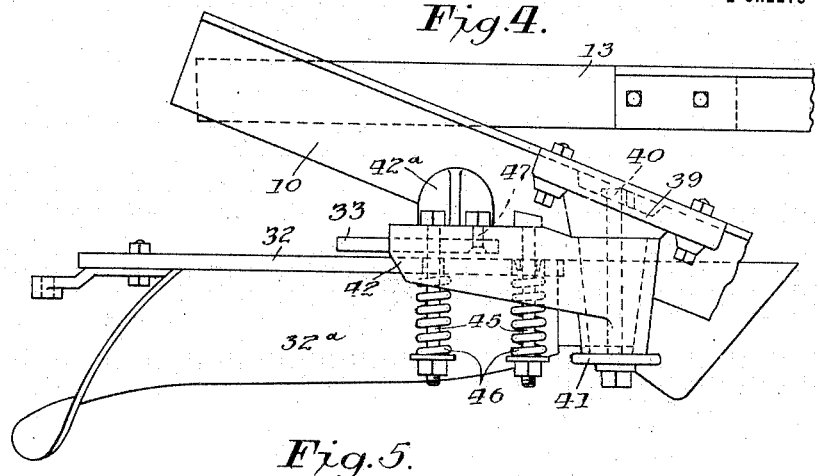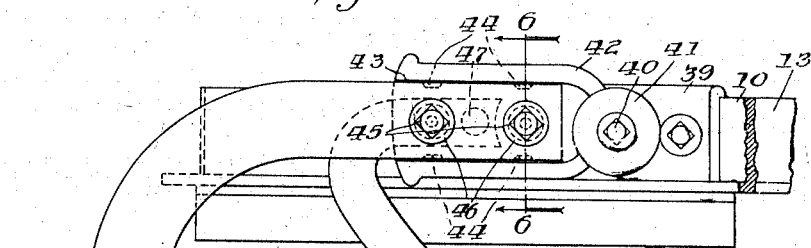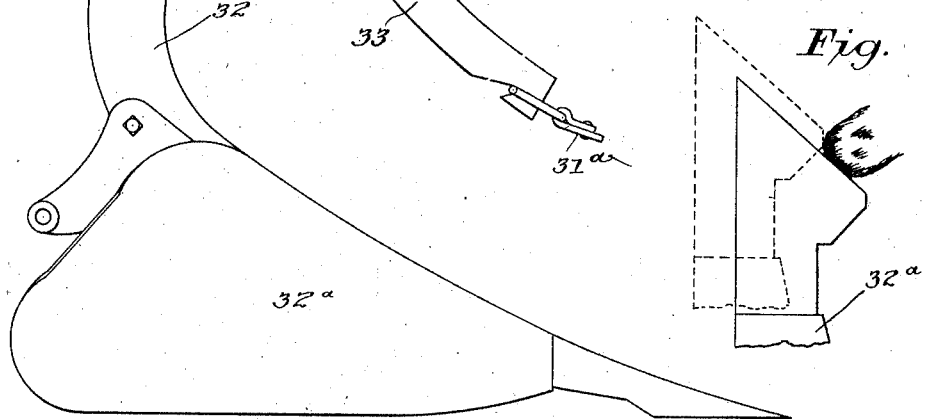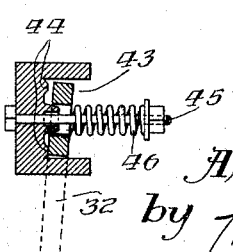

UNITED STATES PATENT OFFICE.

ALEXUS C. LINDGREN, OF HAMILTON, ONTARIO, CANADA, ASSIGNOR, BY MESNE ASSIGNMENTS, TO INTERNATIONAL HARVESTER COMPANY, A CORPORATION OF NEW JERSEY.

PLOW.

1,334,543.  Specification of Letters Patent.  Patented Mar. 23, 1920.

Application filed November 8, 1917. Serial No. 200,898.

*To all whom it may concern:*

Be it known that I, ALEXUS C. LINDGREN, a citizen of the United States, residing at Hamilton, in the county of Wentworth and Province of Ontario, Dominion of Canada, have invented certain new and useful Improvements in Plows, of which the following is a full, clear, and exact specification.

This invention relates to plows and more particularly to stump jump plows.

One object of this invention is to provide a frame having a single diagonal cross beam to which all plows are attached, thereby making it possible to adjust the plows along the beam for various widths of cut.

Another object is to provide a simple and efficient attaching means for plow beams which will permit the plow bases carried thereby to give way to one side on striking an obstruction as a rock, tree stump, etc.

Another object of my invention is to provide a resilient connection between the plow beams and the main frame so that when the plow base meets with an obstruction the plow beam will move laterally and pass around the obstruction or move backward and upward and not bend, as it would if rigidly connected to the frame.

Another object is to provide a strong, light draft means whereby the pull is evenly distributed directly to the several plow bases.

Another object is to provide a gang plow with yieldable plow beams which permit of the plow base taking the easiest path around or over an obstruction. This permits the base to stay in the ground and plow around the obstruction in many cases, which is much better than to be thrown bodily out of the ground as would be the case if it could avoid the obstacle only by jumping over it.

Another object is to provide a gang plow having the foregoing advantages and which is light, efficient and economical to manufacture.

The invention is illustrated in the accompanying sheets of drawings in which,

Fig. 4 is a detail plan view of the resilient connection between the plow base carrying arm and the beam;

Fig. 5 is a side elevation of the same;

Fig. 6 is a section on the line 6—6 of Fig. 5 showing the spring and fulcrum arrangement of the arm with respect to the beam; and Fig. 7 is a detail of the plow point showing the plow passing around an obstruction as a result of the resilient connection shown in Fig. 6.

The same reference numerals designate like parts throughout the several views.

Figure 1:
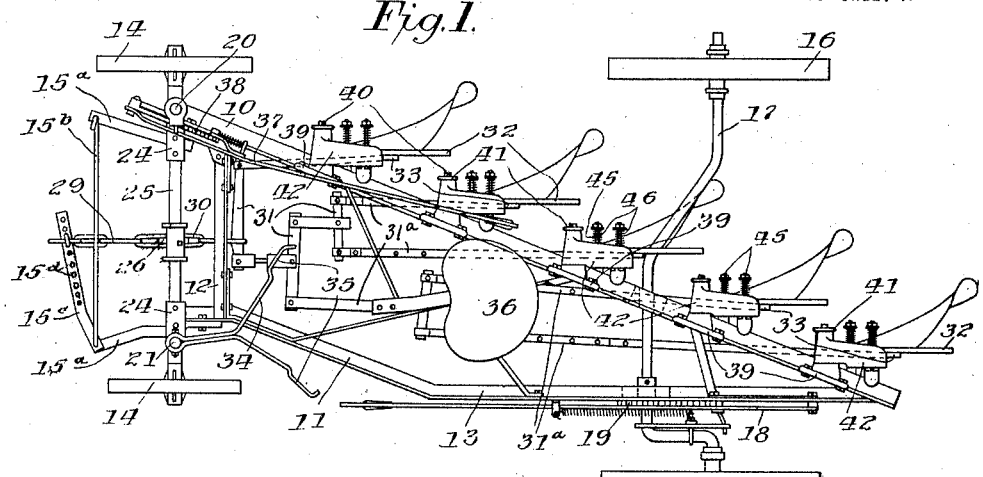
Figure 1 is a plan view of the gang plow provided with my improvements.
Figure 3:
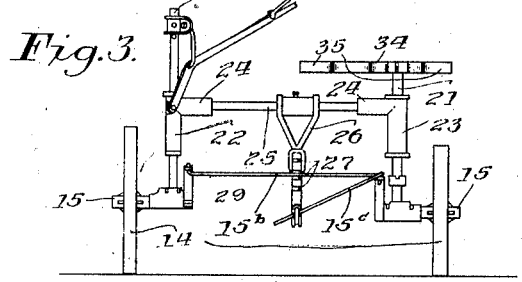
Fig. 3 is a front elevation showing the foot lever steering mechanism and the hand lever for vertically adjusting the beam.
Figure 2:
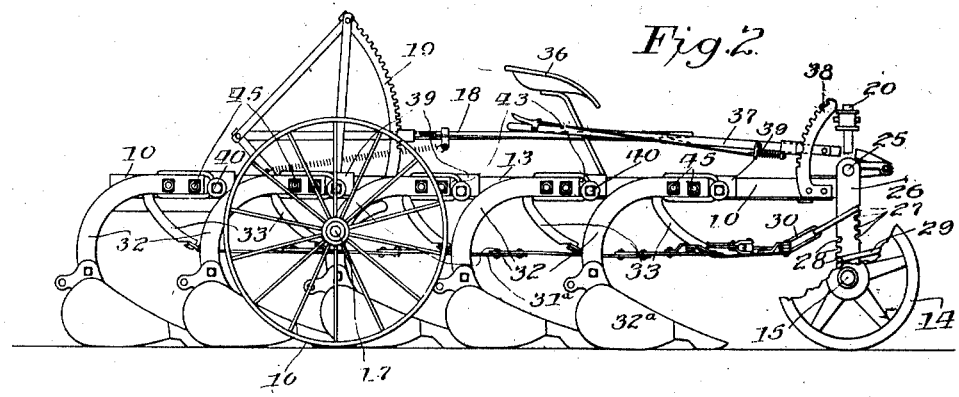
Fig. 2 is a side elevation of the same.

This plow includes a main frame having a diagonally disposed beam 10, a portion 11 parallel therewith, and end and side frame members 12 and 13 which may be placed at various angles. The frame is supported at its forward end by wheels 14 mounted on the stub axles 15 and is supported at the rear end by the wheels 16 mounted on the crank axle 17. The ordinary raising and lowering mechanism for the plow is arranged in connection with the rear wheel crank axle and comprises the lever and segment 18 and 19 respectively.

To the stub axles 15 are mounted vertical spindles 20 and 21 which are journaled respectively in brackets 22 and 23 which are mounted upon the main frame, said brackets having sockets 24 which receive the transverse bar 25. The stub axles 15 carry levers 15$^a$, the outer ends of which are connected by a link 15$^b$ to keep the front wheels parallel.

Pivotally mounted and depending from said bar 25 is a pendulum bar 26 having a plurality of notches 27 and 28 on opposite sides thereof. The notches 28 in said draft pendulum have a tractor coupling or link 29 disposed therein and the notches 27 are in a plane slightly higher than notches 28 and have disposed therein a link connection 30 to which is attached an equalizing mechanism. This equalizer consists of a series of horizontal equalizer bars 31 connected to draft links 31$^a$, each of which is attached to the plow beam 32 by means of the arm 33. Both the plow beam 32 and the arm 33 are mounted on the casting 42 as hereinafter explained.

On the vertical spindle 21 are mounted foot steering levers 34 having stirrups 35. As before explained, the wheels 14 are kept in parallelism by means of levers 15$^a$ and the link 15ᵇ so that any motion transmitted to one is transmitted to the other.

An additional means for automatically steering the plow is provided in the form of a bar 15ᶜ attached at one end to one of the levers 15ᵃ. The other end of the bar 15ᶜ has a series of holes 15ᵈ to which the draft means 29 may be adjustably attached. This results in turning the wheels 14 to follow the movements of the draft means.

Suitably positioned with respect to the steering levers 34 is a driver's seat 36 mounted on the main frame. As before explained, the rear end of the main frame may be raised and lowered by means of the crank shaft 17, attached to the lever 18 and the quadrant 19. The main beam 10 extending diagonally across the implement carries a series of brackets 39 bolted thereto at intervals. Each of these has hingedly mounted thereon a casting 42 having a cone shaped bearing which is held in place by a bolt 40 and a cap 41. Each casting 42 has a foot 42ᵃ adapted to rest on the beam 10, and flanges 43, between which is mounted a plow beam 32 having plow bases 32ᵃ attached thereto, provided for lateral movement therewith by means of bolts 45 and springs 46. Lugs 44 are provided on the casting 42 upon which the beam 32 bears at its upper and its lower edges. Owing to this arrangement of the plow beams and of the springs 46, the lateral movement of the plow beam will usually be an oscillation about a horizontal axis along the line where the lower edge of the beam 32 bears on the lugs 44. The downwardly extending arm 33, which is attached to the equalizer draft connections is also attached to the casting 42 by one of the bolts 45 and the bolt 47.

When in operation, the depth of the plows is regulated by means of the levers 18 and 37 and the quadrants 19 and 38. Should any part of a plow base 32ᵃ strike an obstruction, as a rock or stump, which the plow base cannot turn over in the furrow, the base itself may give way laterally and slide around the object, as shown in Fig. 7, because of the flexible spring elements 46. But should the base strike an object in such a way that it cannot slide around it, the plow base 32ᵃ and beam 32 may swing back vertically about the cone bearing on the bracket 39 until the plow base is able to pass over the obstruction, when it will again resume its normal plowing position.

It frequently happens that the movement of the plow base in dodging an object may be a combination of these two movements. The base may slide around an object for a distance and then be forced to raise partly or wholly out of the ground, or it may raise partly out of the ground when it will find a point where it can slide around the object.

It will be thus noted that by providing two yielding movements, one to the rear and one to the side, it is possible for the plow to select its path and plow around an obstruction wherever possible, rather than to be forced entirely out of the ground. This is a great advantage to have the base stay in the ground and plow wherever possible. This plow is designed to be used in fields of rocks, stumps or roots, and if the base raised out of the ground each time it struck an object which it could not turn over in the furrow, the amount of ground left thus unplowed would be considerable. When the plow stays in the ground and plows around the object there is the added advantage that the object will be loosened and after a number of plowings may be dislodged.

Owing to the peculiar construction of the floating equalizer draft system, all these movements are possible without throwing an unequal load on any one plow or draft member. The load is still evenly distributed even when one plow base is forced to one side or to the rear. When the plow base moves to one side, the draft member 31ᵃ is not affected as the arm 33 does not move to one side, but when the plow base is forced to the rear, the equalizing levers 31 move to adjust themselves to the new position. As soon as the base passes over the obstruction the draft member 31ᵃ pulls it back to its normal plowing position.

While applicant has described a specific embodiment of his invention, he wishes it understood that he is not limited thereby but that he may make such alterations in the structure and combination as come within the scope of the appended claims.

What I claim as new is:

1. In a gang plow, a main frame, a plow beam pivotally carried by a diagonally disposed member, means intermediate said beam and member adapted to allow movement of said beam whereby said beam may oscillate laterally about a horizontal axis to permit a plow base secured thereto to pass around an obstruction.

2. In a gang plow, a main frame, a beam pivotally carried by a diagonally disposed member, means intermediate said beam and member adapted to allow lateral and vertical movement of said beam about a horizontal axis whereby said beam may move laterally or vertically to permit a plow base secured thereto to pass around an obstruction.

3. In a gang plow, a main frame, a plow beam carried by the frame, means intermediate said plow beam and said frame allowing lateral movement of said beam about a horizontal axis and means restoring said beam to its normal position when deflected therefrom.

4. In a gang plow, a frame, plow bases hingedly carried thereby, and draft means including pivotally connected draft elements attached to each plow base for equalizing the draft between the plow bases and adapted to permit longitudinal and sidewise movement of said draft elements whereby the plow bases may move to the rear or to one side upon striking an obstruction.

5. In a gang plow, a frame, plow bases hingedly carried thereby, draft means including pivotally connected draft elements attached to each plow base for equalizing the draft between the plow bases and adapted to permit longitudinal and sidewise movement of said draft elements whereby the plow base may move to the rear or to one side upon striking an obstruction, and means for raising and lowering the frame.

6. In a gang plow, a frame, plow bases hingedly carried thereby, draft means including pivotally connected draft elements attached to each plow base for equalizing the draft between the plow bases and adapted to permit longitudinal and sidewise movement of said draft elements whereby the plow bases may move to the rear or to one side upon striking an obstruction, and means for adjustably raising and lowering the frame.

7. In a gang plow, a frame, plow bases hingedly carried thereby, an equalizing draft means including pivotally connected draft elements attached to each plow base adapted to permit longitudinal and sidewise movement of said draft elements whereby the plow bases may move to the rear or to one side upon striking an obstruction, and means associated with the draft means for automatically steering the plow.

8. In a gang plow, a main frame, castings pivotally mounted for vertical movement on the main frame, plow beams yieldingly mounted on the castings for movement laterally and equalizing draft means connected to the plow beams, whereby the plow beams may yield to take the easiest path around an obstruction.

9. In a wheeled plow, a main frame, a plow beam carried thereby, a plow base mounted on the plow beam, and yielding means for permitting the plow beam to swing laterally about a horizontal axis parallel to the line of draft to permit the plow base to pass around an obstruction.

10. In a wheeled plow, a main frame, a plow beam carried thereby, a plow base mounted on the plow beam, and yielding means for permitting the plow beam to swing laterally about a horizontal axis parallel to the line of draft to permit the plow base to pass around an obstruction.

11. In a wheeled plow, a main frame, a member hingedly mounted thereon for vertical movement, a plow beam yieldingly mounted for lateral movement on the member, a plow base carried by the plow beam, and yielding draft means connected to the member, whereby the plow base is permitted to yield sidewise or to the rear on striking an obstruction.

12. In a gang plow, a main frame, a plow beam pivoted thereon for movement in a vertical plane, a laterally yieldable joint in the beam at the rear of its pivot and yieldable draft means connected to the beam.

13. In a gang plow, a main frame, a plow beam pivoted thereon for movement in a vertical plane, a laterally yieldable joint in the beam at the rear of its pivot and yieldable draft means connected to the beam independently of its yieldable joint.

14. In a gang plow, a main frame, a plow beam, an attachment for said plow beam hingedly mounted on the frame to permit movement in a vertical plane, and a spring mounting on the attachment, to permit movement of the plow beam at right angles to said vertical plane.

15. In a gang plow, a main frame, a plow beam, an attachment for said plow beam hingedly mounted on the frame to permit movement in a vertical plane, a spring mounting on the attachment, to permit movement of the plow beam at right angles to said vertical plane, and a yielding draft means mounted on said attachment.

16. In a gang plow, a main frame, a plow beam, an attachment for said plow beam hingedly mounted on the frame to permit movement in a vertical plane, said plow beam held against the attachment by means of a spring which permits side swing of the plow beam at an angle to said vertical plane.

17. In a wheeled plow, a main frame, a member mounted thereon to move relatively thereto in a vertical plane, a plow beam mounted on the member to yield laterally under strain, a plow base carried by the plow beam, and yielding draft means movable vertically with the beam, whereby the plow base is permitted to yield laterally and vertically on striking an obstruction.

18. In a wheeled plow, a main frame, a member mounted thereon to move relatively thereto in a vertical plane, a plow beam mounted on the member to yield laterally under strain, a plow base carried by the plow beam, and yielding draft means movable vertically with the beam under tension, whereby the plow base is permitted to yield laterally or vertically on striking an obstruction, and is drawn back to normal plowing position after passing an obstruction.

In testimony whereof I affix my signature.

ALEXUS C. LINDGREN.

Witnesses:
L. SHOMO,
L. C. STONES.